United States Patent
Maaref et al.

(10) Patent No.: US 10,531,494 B2
(45) Date of Patent: Jan. 7, 2020

(54) REFERENCE SIGNAL SCRAMBLING FOR RANDOM ACCESS

(71) Applicant: Huawei Technologies Co., Ltd., Shenzhen (CN)

(72) Inventors: Amine Maaref, Kanata (CA); Kelvin Kar Kin Au, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/859,086

(22) Filed: Dec. 29, 2017

(65) Prior Publication Data
US 2018/0206272 A1    Jul. 19, 2018

Related U.S. Application Data

(60) Provisional application No. 62/447,277, filed on Jan. 17, 2017.

(51) Int. Cl.
*H04W 72/04* (2009.01)
*H04W 74/08* (2009.01)
*H04K 1/02* (2006.01)
*H04L 5/00* (2006.01)

(52) U.S. Cl.
CPC .......... *H04W 74/0833* (2013.01); *H04K 1/02* (2013.01); *H04L 5/0048* (2013.01); *H04L 5/0053* (2013.01); *H04W 72/042* (2013.01); *H04W 72/044* (2013.01); *H04W 72/0466* (2013.01)

(58) Field of Classification Search
CPC ........... H04W 74/0833; H04W 72/042; H04W 72/0466; H04K 1/02
See application file for complete search history.

(56) References Cited

U.S. PATENT DOCUMENTS

| | | | |
|---|---|---|---|
| 2008/0305788 A1* | 12/2008 | Malladi | H04J 11/0069 455/428 |
| 2009/0041240 A1* | 2/2009 | Parkvall | H04W 74/004 380/247 |
| 2009/0136034 A1* | 5/2009 | Gaal | G06F 7/584 380/268 |
| 2009/0268910 A1 | 10/2009 | Liu et al. | |
| 2009/0270122 A1* | 10/2009 | Chmiel | H04J 11/0093 455/550.1 |
| 2010/0172235 A1* | 7/2010 | Liu | H04J 11/0069 370/208 |
| 2011/0075629 A1* | 3/2011 | Seo | H04W 74/002 370/330 |
| 2012/0309405 A1* | 12/2012 | Parkvall | H04W 48/08 455/452.1 |
| 2013/0308555 A1 | 11/2013 | Ho | |
| 2014/0226593 A1 | 8/2014 | Han et al. | |

(Continued)

*Primary Examiner* — Chi Ho A Lee
(74) *Attorney, Agent, or Firm* — Slater Matsil, LLP

(57) ABSTRACT

An embodiment method at a network device for scrambling a downlink reference signal for a UE for demodulation of a downlink random access message during a random access procedure to the network includes scrambling the downlink reference signal using one of a temporary UE ID provided to the UE during the random access procedure, a random access ID generated during the random access procedure, or a dedicated UE ID assigned by the network.

32 Claims, 5 Drawing Sheets

(56) References Cited

U.S. PATENT DOCUMENTS

| | | | |
|---|---|---|---|
| 2014/0226614 A1 | 8/2014 | Kato et al. | |
| 2014/0328301 A1* | 11/2014 | Kim | H04L 5/0053 |
| | | | 370/329 |
| 2015/0172940 A1* | 6/2015 | Nagata | H04W 4/06 |
| | | | 370/252 |
| 2015/0373626 A1 | 12/2015 | Yi et al. | |
| 2016/0360567 A1* | 12/2016 | Wu | H04W 8/26 |

* cited by examiner

Pseudo-random sequence generation

Pseudo-random sequences are defined by a length-31 Gold sequence. The output sequence $c(n)$ of length $M_{PN}$, where $n = 0, 1, ..., M_{PN} - 1$, is defined by $$c(n) = (x_1(n + N_C) + x_2(n + N_C)) \bmod 2$$

$$x_1(n + 31) = (x_1(n+3) + x_1(n)) \bmod 2$$

$$x_2(n + 31) = (x_2(n+3) + x_2(n+2) + x_2(n+1) + x_2(n)) \bmod 2$$

where $N_C = 1600$ and the first m-sequence shall be initialized with $x_1(0) = 1, x_1(n) = 0, n = 1, 2, ..., 30$. The initialization of the second m-sequence is denoted by $c_{init} = \sum_{i=0}^{30} x_2(i) \cdot 2^i$ with the value depending on the application of the sequence.

For antenna port 5, the UE-specific reference-signal sequence $r_{n_s}(m)$ is defined by $$r_{n_s}(m) = \frac{1}{\sqrt{2}}(1 - 2 \cdot c(2m)) + j\frac{1}{\sqrt{2}}(1 - 2 \cdot c(2m+1)), \quad m = 0, 1, ..., 12N_{RB}^{PDSCH} - 1$$

where $N_{RB}^{PDSCH}$ denotes the assigned bandwidth in resource blocks of the corresponding PDSCH transmission. The pseudo-random sequence $c(i)$ is defined in clause 7.2. The pseudo-random sequence generator shall be initialized with 410 ⟶ $c_{init} = (\lfloor n_s/2 \rfloor + 1) \cdot (2N_{ID}^{cell} + 1) \cdot 2^{16} + n_{RNTI}$ at the start of each subframe where $n_{RNTI}$ is as described in clause 7.1

3GPP TS 36.213 [4].

FIG. 4

REFERENCE SIGNAL SCRAMBLING FOR RANDOM ACCESS

CROSS-REFERENCE TO RELATED APPLICATIONS

This application claims benefit to Provisional Application No. 62/447,277, filed on Jan. 17, 2017, the disclosure of which is hereby incorporated by reference in its entirety.

TECHNICAL FIELD

The present disclosure relates generally to a system and method for wireless communications and, in particular embodiments, to a system and method for reference signal scrambling for random access.

BACKGROUND

An access point, a base station, an evolved node B (eNB), a next generation node B (gNB), a transmit/receive point (TRP), a similar component, or any combination of such components may be referred to herein as a network or a network device. Actions and methods described herein as being performed by a network or a network device may be performed by one or more such components. A network or a network device may transmit downlink reference signals for use by a user equipment (UE), a mobile station, or a similar component.

Downlink transmissions are carried out from a specific antenna port, which is known a priori to a UE receiving the transmissions. From a device perspective, there is a one-to-one mapping between the radio channel experienced by a signal transmitted on the downlink and the antenna port from which the signal has been transmitted. Each antenna port can be seen as corresponding to one downlink reference signal. A downlink reference signal may be used by the UE to estimate the channel corresponding to the antenna port for coherent demodulation and to derive detailed channel state information (CSI) related to the antenna port for, e.g., downlink link adaptation and scheduling or beam management.

Among the downlink reference signals used in Long Term Evolution (LTE) systems for the purpose of channel estimation and CSI acquisition are the common reference signal (CRS), the demodulation reference signal (DM-RS), the CSI reference signal (CSI-RS), the multicast-broadcast single-frequency network (MBSFN) reference signal, and the positioning reference signal.

Downlink reference signals in LTE may be classified as cell-specific reference signals or UE-specific reference signals. Cell-specific reference signals are tied to the physical cell identifier (PCID) and are the same for all the UEs in a cell, once configured. UE-specific reference signals are intended for a specific UE and are not necessarily associated with a specific PCID. The CRS is typically cell-specific and transmitted in a wide band across the system bandwidth. The DM-RS is typically UE-specific and self-contained, i.e., transmitted within the time-frequency resources of UE-specific channels, such as a control or data channel (e.g., the physical downlink control channel (PDCCH) or the physical downlink shared channel (PDSCH) in LTE). In some cases, the same reference signal may be cell-specific or UE-specific, depending on the configuration.

SUMMARY

In accordance with an embodiment of the present disclosure, a method at a network device for scrambling a downlink reference signal for a UE for demodulation of a downlink random access message during a random access procedure to the network comprises scrambling the downlink reference signal using one of a temporary UE ID provided to the UE during the random access procedure, a random access ID generated during the random access procedure, or a dedicated UE ID assigned by the network.

In the previous embodiment, the random access message might be at least one of a random access response message or a contention resolution message. In any of the previous embodiments, the dedicated UE ID might be a C-RNTI used to identify a RRC connection dedicated to the UE. In any of the previous embodiments, the random access ID might be generated based on at least one of a random access preamble or time and frequency resources used by the UE. In any of the previous embodiments, the random access ID might be a RA-RNTI derived by the network during the random access procedure, and the RA-RNTI might be derived in accordance with a RACH preamble detected by the network. In any of the previous embodiments, the random access ID might be generated based on a synchronization signal transmitted by the network. In any of the previous embodiments, the synchronization signal might be transmitted in a beam-forming and beam sweeping manner. In any of the previous embodiments, timing of the beam sweeping might be a term used in a formula for generating the random access ID. In any of the previous embodiments, the random access ID might comprise a random access identifier generated based on an SS block index of an SS block within a set of SS blocks. In any of the previous embodiments, the random access ID might comprise a random access identifier generated based on an SS block time index associated with one or more SS blocks. In any of the previous embodiments, the random access ID might comprise an RA-RNTI generated as $$RA\text{-}RNTI = 1 + t\_id + N\_\text{subframe} * f\_id + SS\_block + N\_SS\_Block * SS\_block\_time\_index$$

wherein
- RA-RNTI is the random access ID,
- t_id is an index of a subframe of a plurality of subframes, N_subframe, of a physical random access channel (PRACH),
- f_id is an index in a frequency domain of the PRACH within the subframe,
- SS_block indicates an SS block index of an SS block within a set of concurrently transmitted SS blocks,
- SS_block_time_index is an index ranging from 0 to N_SS_Block−1, and
- N_SS_Block is a maximum number of SS blocks concurrently transmitted per SS block time index.

In any of the previous embodiments, the random access ID might be used to scramble a reference signal for a random access response message sent by the network in the random access procedure, and the temporary UE ID might be used to scramble a reference signal for a contention resolution message sent by the network in the random access procedure.

In accordance with another embodiment of the present disclosure, a method for demodulation of a downlink RAR message by a UE comprises, during a random access procedure for access of the UE to a network, the UE receiving a downlink reference signal scrambled using an identifier; and demodulating the downlink RAR message using the downlink reference signal.

In the previous embodiment, the identifier might be one of a dedicated UE identifier; a random access identifier; or a temporary identifier communicated by the network during the random access procedure. In any of the previous embodiments, the random access identifier might be a RA-RNTI generated based on at least one of a random access preamble used by the UE in the random access procedure or time and frequency resources used by the UE in the random access procedure. In any of the previous embodiments, the random access identifier might be derived in accordance with a synchronization signal transmitted by the network. In any of the previous embodiments, the synchronization signal might be transmitted in a beamforming and beam sweeping manner. In any of the previous embodiments, timing of the beam sweeping might be a term used in a formula for deriving the random access identifier. In any of the previous embodiments, the identifier might comprise a random access identifier generated based on an SS block index of an SS block within a set of SS blocks. In any of the previous embodiments, the identifier might comprise a random access identifier generated based on an SS block time index associated with one or more SS blocks. In any of the previous embodiments, the identifier might comprise an RA-RNTI generated as $$RA\text{-}RNTI=1+t\_id+N\_subframe*f\_id+SS\_block+N\_SS\_Block*SS\_block\_time\_index$$

wherein
RA-RNTI is a random access identifier,
t_id is an index of a subframe of a plurality of subframes, N_subframe, of a physical random access channel (PRACH),
f_id is an index in a frequency domain of the PRACH within the subframe,
SS_block indicates an SS block index of an SS block within a set of concurrently transmitted SS blocks,
SS_block_time_index is an index ranging from 0 to N_SS_Block−1, and
N_SS_Block is a maximum number of SS blocks concurrently transmitted per SS block time index.

In accordance with another embodiment of the present disclosure, a random access method for a network comprises receiving a random access preamble from a UE; generating an identifier; scrambling a reference signal for the UE with the identifier; transmitting a random access message to the UE; and transmitting the scrambled reference signal for demodulation of the random access message by the UE.

In the previous embodiment, the reference signal for the UE might be associated with a PDSCH. In any of the previous embodiments, the reference signal for the UE might be associated with a PDCCH. In any of the previous embodiments, the identifier might be one of a temporary UE identifier provided to the UE during the random access method; a random access identifier generated during the random access method; or a dedicated UE identifier. In any of the previous embodiments, the random access identifier might be generated based on at least one of a random access preamble or time and frequency resources used by the UE.

In accordance with another embodiment of the present disclosure, a method for a UE to receive a random access message from a network during a random access procedure with the network comprises receiving a reference signal scrambled with an identifier known to the network; descrambling the reference signal with the same identifier known to the UE; and demodulating the random access message using the descrambled reference signal.

In the previous embodiment, the identifier might be one of a temporary UE identifier provided to the UE during the random access procedure; a random access identifier generated during the random access procedure; or a dedicated UE identifier assigned by the network. In any of the previous embodiments, the random access identifier might be generated based on at least one of a random access preamble or time and frequency resources used by the UE.

In accordance with another embodiment of the present disclosure, a network device comprises a non-transitory memory storage containing instructions and one or more processors in communication with the memory storage. The one or more processors execute the instructions to scramble a downlink reference signal for a UE for demodulation of a downlink random access message during a random access procedure to the network using one of a temporary UE ID provided to the UE during the random access procedure, a random access ID generated during the random access procedure, or a dedicated UE ID assigned by the network.

In the previous embodiment, the downlink random access message might be at least one of a random access response message or a contention resolution message. In any of the previous embodiments, the dedicated UE ID might be a C-RNTI used to identify a RRC connection dedicated to the UE. In any of the previous embodiments, the random access ID might be generated based on at least one of a random access preamble or time and frequency resources used by the UE. In any of the previous embodiments, the random access ID might be a RA-RNTI derived by the network during the random access procedure, and the RA-RNTI might be derived in accordance with a RACH preamble detected by the network. In any of the previous embodiments, the random access ID might be generated based on a synchronization signal transmitted by the network. In any of the previous embodiments, the synchronization signal might be transmitted in a beamforming and beam sweeping manner. In any of the previous embodiments, timing of the beam sweeping might be a term used in a formula for generating the random access ID. In any of the previous embodiments, the random access ID might comprise a random access identifier generated based on an SS block index of an SS block within a set of SS blocks. In any of the previous embodiments, the random access ID might comprise a random access identifier generated based on an SS block time index associated with one or more SS blocks. In any of the previous embodiments, the random access ID might comprise an RA-RNTI generated as $$RA\text{-}RNTI=1+t\_id+N\_subframe*f\_id+SS\_block+N\_SS\_Block*SS\_block\_time\_index$$

wherein
RA-RNTI is the random access ID,
t_id is an index of a subframe of a plurality of subframes, N_subframe, of a physical random access channel (PRACH),
f_id is an index in a frequency domain of the PRACH within the subframe,
SS_block indicates an SS block index of an SS block within a set of concurrently transmitted SS blocks,
SS_block_time_index is an index ranging from 0 to N_SS_Block−1, and
N_SS_Block is a maximum number of SS blocks concurrently transmitted per SS block time index.
In any of the previous embodiments, the random access ID might be used to scramble a reference signal for a random access response message sent by the network in the random access procedure, and the temporary UE ID might be used to scramble a reference signal for a contention resolution message sent by the network in the random access procedure.

In accordance with another embodiment of the present disclosure, a UE comprises a non-transitory memory storage containing instructions and one or more processors in communication with the memory storage. The one or more processors execute the instructions to perform a method for demodulation of a downlink RAR message by the UE. The method comprises, during a random access procedure for access of the UE to a network, the UE receiving a downlink reference signal scrambled using an identifier and demodulating the downlink RAR message using the downlink reference signal.

In the previous embodiment, the identifier might be one of a dedicated UE identifier; a random access identifier; or a temporary identifier communicated by the network during the random access procedure. In any of the previous embodiments, the random access identifier might be a RA-RNTI generated based on at least one of a random access preamble used by the UE in the random access procedure or time and frequency resources used by the UE in the random access procedure. In any of the previous embodiments, the random access identifier might be derived in accordance with a synchronization signal transmitted by the network. In any of the previous embodiments, the synchronization signal might be transmitted in a beamforming and beam sweeping manner. In any of the previous embodiments, timing of the beam sweeping might be a term used in a formula for deriving the random access identifier. In any of the previous embodiments, the identifier might comprise a random access identifier generated based on an SS block index of an SS block within a set of SS blocks. In any of the previous embodiments, the identifier might comprise a random access identifier generated based on an SS block time index associated with one or more SS blocks. In any of the previous embodiments, the identifier might comprise an RA-RNTI generated as $$RA\text{-}RNTI = 1 + t\_id + N\_\text{subframe} * f\_id + SS\_block + N\_SS\_Block * SS\_block\_time\_index$$

wherein
RA-RNTI is a random access identifier,
t_id is an index of a subframe of a plurality of subframes, N_subframe, of a physical random access channel (PRACH),
f_id is an index in a frequency domain of the PRACH within the subframe,
SS_block indicates an SS block index of an SS block within a set of concurrently transmitted SS blocks,
SS_block_time_index is an index ranging from 0 to N_SS_Block−1, and
N_SS_Block is a maximum number of SS blocks concurrently transmitted per SS block time index.

In accordance with another embodiment of the present disclosure, a network device comprises a non-transitory memory storage containing instructions and one or more processors in communication with the memory storage. The one or more processors execute the instructions to perform a method comprising receiving a random access preamble from a UE; generating an identifier; scrambling a reference signal for the UE with the identifier; transmitting a random access message to the UE; and transmitting the scrambled reference signal for demodulation of the random access message by the UE.

In the previous embodiment, the reference signal for the UE might be associated with a PDSCH. In any of the previous embodiments, the reference signal for the UE might be associated with a PDCCH. In any of the previous embodiments, the identifier might be one of a temporary UE identifier provided to the UE during a random access procedure; a random access identifier generated during the random access procedure; or a dedicated UE identifier. In any of the previous embodiments, the random access identifier might be generated based on at least one of a random access preamble or time and frequency resources used by the UE. In any of the previous embodiments, the identifier might comprise a random access identifier generated based on an SS block index of an SS block within a set of SS blocks. In any of the previous embodiments, the identifier might comprise a random access identifier generated based on an SS block time index associated with one or more SS blocks. In any of the previous embodiments, the identifier might comprise an RA-RNTI generated as $$RA\text{-}RNTI = 1 + t\_id + N\_\text{subframe} * f\_id + SS\_block + N\_SS\_Block * SS\_block\_time\_index$$

wherein
RA-RNTI is a random access identifier,
t_id is an index of a subframe of a plurality of subframes, N_subframe, of a physical random access channel (PRACH),
f_id is an index in a frequency domain of the PRACH within the subframe,
SS_block indicates an SS block index of an SS block within a set of concurrently transmitted SS blocks,
SS_block_time_index is an index ranging from 0 to N_SS_Block−1, and
N_SS_Block is a maximum number of SS blocks concurrently transmitted per SS block time index.

In accordance with another embodiment of the present disclosure, a UE comprises a non-transitory memory storage containing instructions and one or more processors in communication with the memory storage. The one or more processors execute the instructions to perform a method comprising receiving a reference signal scrambled with an identifier known to a network with which the UE is performing a random access procedure; descrambling the reference signal with the same identifier known to the UE; and demodulating, using the descrambled reference signal, a random access message received from the network during the random access procedure.

In the previous embodiment, the identifier might be one of a temporary UE identifier provided to the UE during the random access procedure; a random access identifier generated during the random access procedure; or a dedicated UE identifier assigned by the network. In any of the previous embodiments, the random access identifier might be generated based on at least one of a random access preamble or time and frequency resources used by the UE.

BRIEF DESCRIPTION OF THE DRAWINGS

For a more complete understanding of the present disclosure, and the advantages thereof, reference is now made to the following descriptions taken in conjunction with the accompanying drawings, in which:
FIG. 4 illustrates a procedure for pseudo-random sequence generation.

DETAILED DESCRIPTION OF ILLUSTRATIVE EMBODIMENTS

Figure 1:
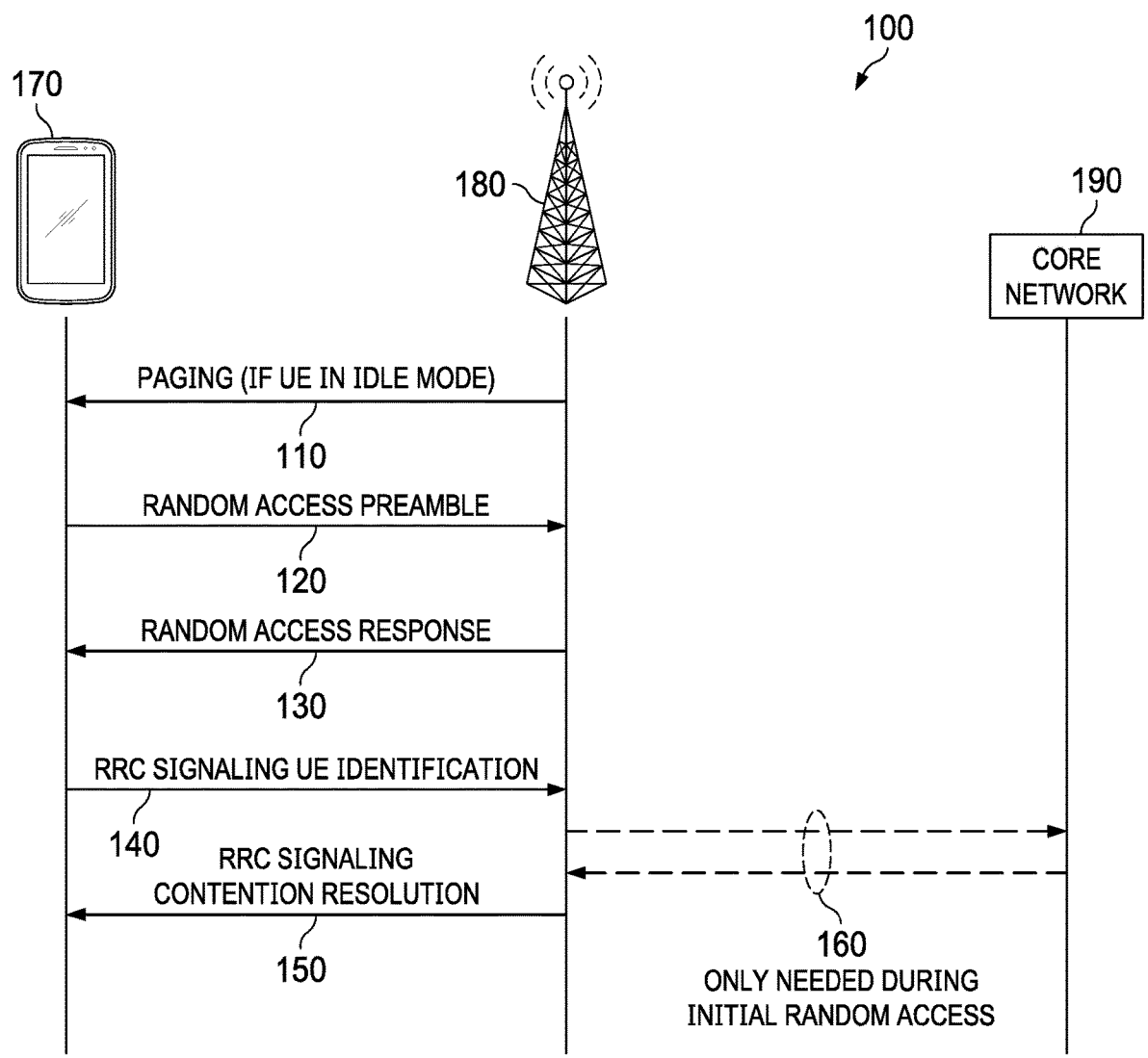
FIG. 1 is a diagram of a random access procedure.

The structure, manufacture and use of the presently preferred embodiments are discussed in detail below. It should be appreciated, however, that the present disclosure provides many applicable novel concepts that can be embodied in a wide variety of specific contexts. The specific embodiments discussed are merely illustrative of specific ways to make and use the embodiments, and do not limit the scope of the disclosure.

A UE may connect to or synchronize with a network in a procedure known as a random access procedure. As used herein, the term "random access procedure" refers to both initial access of the UE with the network and non-initial access (e.g., contention-free random access for handover or state transition purposes). During a random access procedure, the UE sends a random access preamble to the network, and the network responds with a random access response (RAR) message. The UE uses reference signals received from the network to demodulate the RAR message. In LTE, the network may scramble the reference signals based on the cell identifier (ID), which may be broadcast by the network and/or acquired by the UE using downlink synchronization signals broadcast by the network.

In the evolving new radio (NR) systems, the trend may be to rely on UE-specific reference signals rather than cell-specific signals such as the CRS. Thus, scrambling of reference signals in NR may be based on a UE ID rather than on a cell ID. In particular, the UE ID may be used for scrambling of the downlink CSI-RS for the purpose of CSI acquisition in a coordinated multi-point (CoMP) setting as well as for scrambling of UE-specific uplink, downlink, and sidelink reference signals for the purpose of channel estimation for coherent demodulation or CSI acquisition for efficient link adaptation and scheduling.

When an initial random access procedure is complete, the UE is assigned a UE ID that is used throughout the duration of UE's connection with the network. Such a UE ID is known as the cell radio network temporary identifier (C-RNTI) and may also be referred to herein as a dedicated UE ID. Since a dedicated UE ID is not assigned to a UE until the random access procedure is complete, a dedicated UE ID may not be available during the random access procedure for use in scrambling and descrambling the RAR message. Since a CRS may not be used in NR systems, there may be no cell-specific reference signals available for use in scrambling and descrambling the RAR message. With a dedicated UE ID unavailable during the initial random access procedure in an NR system, it may not be clear how the UE can properly demodulate messages (e.g., the RAR message) received from the network.

It should be noted that in some embodiments, a UE may already be assigned a UE ID and may still perform a random access procedure. This can be the case when the UE is already in Radio Resource Control (RRC) connected mode and is about to be handed over to another cell. In this case, the UE performs a so-called contention-free random access procedure, which means that the network assigns a preamble to the UE, which the UE then uses to carry out event 120, described below with regard to FIG. 1 (i.e., sending a Physical Random Access Channel (PRACH) signal message to the network at event 120). In other embodiments, a UE may perform another type of contention-free random access for the purpose of state transition from the RRC connected inactive/eco state to the RRC connected state. In this case, the UE has already acquired a UE ID and uses the UE ID to select a contention-free preamble before sending the preamble to the network to carry out event 120 (i.e., sending a PRACH signal message to the network at event 120). In both these cases, the network may use the UE ID (e.g., the C-RNTI, dedicated UE ID or cell-specific UE ID) to scramble the cyclic redundancy check (CRC) of the control channel (PDCCH) corresponding to the RAR message (event 130 described below) in the PDSCH and also to scramble the reference signal that will enable the UE to estimate the channel and acquire CSI for coherent demodulation of the RAR message.

Embodiments of the present disclosure provide methods for the scrambling and descrambling of a reference signal used in a UE's initial access to a network when a cell-specific reference signal is not present. In some embodiments, scrambling is performed by the network using a random access identifier derived based on the selected preamble and/or PRACH resources used by the UE. The UE can derive and use the identifier to descramble reference signals in order to demodulate the RAR message.

More specifically, in contention-based random access embodiments, a temporary UE ID is sent from a network to a UE in the random access procedure and is used during the random access procedure until a dedicated UE ID is assigned. In an embodiment, the temporary UE ID is a random access radio network temporary identifier (RA-RNTI), and the temporary UE ID may be referred to hereinafter as the RA-RNTI, but it should be understood that other temporary UE IDs may be used. In an embodiment, the RA-RNTI is used to scramble a reference signal for coherent demodulation of a RAR message.

The RA-RNTI is derived by the UE based on the random access preamble and/or RACH resources (e.g., time-frequency) it used for transmitting the preamble. The RACH signal is sent to the network by the UE during a random access procedure. The network responds to the reception of the preamble by sending a RAR message where it can make use of the RA-RNTI. The network knows the RA-RNTI from the reception of the message. That is, by detecting the preamble and/or PRACH resources, the network can make the same derivation of the RA-RNTI as the UE. In some embodiments, there may also be an implicit or explicit association between the preamble/PRACH resources used by the UE for sending the preamble message and/or certain synchronization signals used by the network so that when the network receives the message, the network can link the message to a certain synchronization signal. Hence, the linkage/relationship between the preamble/PRACH resources used by the UE and RA-RNTI or synchronization signal can be known a priori by both the UE and the network and need not be signaled each time. Hence, the network sends a RAR message and uses the RA-RNTI to scramble the CRC of the control channel corresponding to the RAR message and, in some embodiments, may also use RA-RNTI to scramble the DM-RS corresponding to the RAR message sent in the downlink shared channel (DL-SCH) and mapped to the PDSCH.

In an embodiment, the RA-RNTI is derived from and/or linked to PRACH resources used in the random access procedure. Alternatively or additionally, the RA-RNTI may be linked to a synchronization signal broadcast by the network.

The dedicated UE ID (e.g., the C-RNTI), on the other hand, is assigned by the network, and is typically acquired by the UE after the initial random access procedure is complete, and is not based on the PRACH resources used in the random access procedure. In some embodiments, the C-RNTI is dedicated to the UE because it is an ID that is used to identify a RRC connection dedicated to a particular UE.

In an embodiment, a method is provided to calculate the RA-RNTI using a linkage with synchronization signal blocks in a high frequency case. In addition or in an alternative, a temporary identifier (T-RNTI) conveyed by the network through the RAR message may be used to scramble the CRC corresponding to the control channel indicating a DL-SCH contention resolution message mapped to the PDSCH as well as scramble the reference signal for (coherent) demodulation of the RAR message. For contention-free random access embodiments, where the UE has already been assigned a dedicated UE ID, the dedicated UE ID may be used to scramble the reference signal for coherent demodulation of the RAR message.

To summarize the different types of UE IDs and RNTIs described herein, the dedicated UE ID or dedicated RNTI is unique within a NR cell. The temporary UE ID or T-RNTI is not UE-specific and is communicated by the network at event 130 described below. The RA-RNTI is not UE-specific and is derived by the network and the UE based on various formulas which depend on the preamble and/or PRACH resources used by the UE to send the message at event 120 described below. The RA-RNTI may also or in an alternative depend on the synchronization signal (SS) block time index detected or selected by the UE in some embodiments. The RA-RNTI and the T-RNTI are used during an initial random access procedure. The dedicated RNTI is used during a non-initial random access procedure.

In an embodiment, the network combines several responses into a single RAR message, and then the network may send a group-shared reference signal scrambled with the RA-RNTI to enable more efficient channel estimation performance owing to better filtering performance. That is, the sharing of the same reference signal by multiple users might allow the use of a longer reference signal, which might allow for more efficient channel estimation.

FIG. 1 illustrates steps that may be taken in a random access procedure boo. The procedure 100 is described from the perspective of a case where the UE is performing an initial random access procedure at the end of which UE is assigned a dedicated UE ID. However, similar actions may occur in a case where the UE is already assigned a dedicated UE ID (i.e., a non-initial random access procedure).

At event 110, a network 180 may page a UE 170 if the UE 170 is in the idle mode. At event 120, the UE 170 sends a random access preamble to the network 180. At event 130, the network 180 sends the UE 170 a RAR message. Also at event 130, the network 180 sends the UE 170 the temporary identifier described above (e.g., a T-RNTI) that is used for subsequent steps of the random access procedure 100 until the UE 170 acquires a dedicated UE ID. This temporary identifier is used for UE-specific scrambling of the message at event 140. Also at event 130, a RA-RNTI may be used to scramble a reference signal for coherent demodulation of a RAR message. Events 140 and 150 of the random access procedure 100 are used for UE identification and contention resolution, respectively. At event 140, the UE 170 sends a UE identification message to the network 180 via RRC signaling. The UE 170 sends the message at event 140 on the uplink shared channel (UL-SCH) using an assigned uplink grant received at event 130. The message at event 140 indicates a core network ID to the network 180, since the UE 170 has not yet acquired a dedicated UE ID at this point. That is, the network 180 may not recognize the UE 170, so the network 180 may need to communicate with a core network to confirm the validity of this core network ID, as described in more detail below. At event iso, the network 180 sends the UE 170 a contention resolution message via RRC signaling. Also at event iso, the temporary identifier generated by the network 180 may be used to scramble the DL-SCH contention resolution message. The UE 170 may receive this temporary identifier from the network 180 in the message at event 130. The UE 170 may acquire the dedicated UE ID at event 150. In an embodiment, the temporary identifier (e.g., a T-RNTI) is promoted to become the de facto dedicated UE ID after the completion of the random access procedure 100.

The random access response message shown at event 130 and the contention resolution message shown at event 150 may be referred to more generally as random access messages. The scrambling described herein may be applied for coherent demodulation of any random access message from the network that is transmitted to the UE 170 before the UE 170 is assigned a dedicated UE ID or determines it can use a dedicated UE ID.

From information in the message at event 140, the network 180 knows whether the UE 170 has already been assigned a dedicated UE ID. If a dedicated UE ID has not been assigned, that is, if the UE 170 is not known to the network 180 at the time of the random access procedure 100, the network 180 may need to communicate with a core network 190 to check the core network ID received from the UE 170 as part of the message at event 140. That is, the messages shown at 160 are sent. If a dedicated UE ID has been assigned, there is no need for the messages shown at 160 to be sent. The message at event 150 is addressed on the PDDCH using a temporary identifier provided to the UE 170 at event 130. If the UE 170 observes a match between the core network ID that the UE 170 receives at event 150 and the core network ID that the UE 170 sent at event 140, the UE 170 declares the random access procedure 100 successful and may promote the temporary identifier (e.g., a T-RNTI) to be the dedicated UE ID for use in subsequent data communication with the network 180.

In an embodiment, at least three cases may apply to scrambling the downlink reference signal during a random access procedure. For initial random access, where a dedicated UE ID is not known at the UE 170, the RA-RNTI may be used for the RAR message at event 130 or the T-RNTI may be used for the contention resolution message at event 150. For contention-free random access, where a dedicated UE ID is known at the UE 170, the dedicated UE ID may be used for the RAR message at event 130.

In LTE, as part of the random access procedure 100, the network 180 transmits a RAR message on the DL-SCH, which is mapped to the PDSCH as a response to the random access preamble sent by the UE 170 at event 120. The RAR message is scheduled on the DL-SCH and indicated on the PDCCH using a reserved identity, the so-called RA-RNTI. The network 180 scrambles the PDCCH's CRC with the RA-RNTI for transmission of the PDSCH that carries the RAR message. Use of the RA-RNTI may be necessary at this stage, as the UE 170 may not yet have an assigned dedicated UE ID, such as a dedicated RNTI. All UEs that are associated with the network 180 and that send a random access preamble may monitor the downlink control channel for RAR messages within a configurable time window. The RAR messages may be addressed to multiple UEs. That is, multiple UEs may decode the PDCCH scrambled by the same RA-RNTI. The RA-RNTI may be mapped to the time-frequency resources used by the UE 170 to transmit the random access preamble. In LTE, the RA-RNTI has a length of 16 bits and its value is derived from the following formula:

$$\text{RA-RNTI} = 1 + t\_id + 10 * f\_id$$

where t_id is the index of the first subframe of the PRACH (0≤t_id<10), and f_id is the index of the specified PRACH within that subframe, in ascending order of frequency domain (0≤f_id<6).

For frequency division duplexing (FDD) there is at most one PRACH resource per subframe, and the RA-RNTI range is 1 to 10, whereas for time division duplexing (TDD), the RA-RNTI ranges from 1 to 60.

The network 180 may embed a DM-RS in the PDSCH corresponding to the RAR message in order to enable coherent demodulation of the RAR message. The DM-RS may be scrambled with the RA-RNTI since a dedicated UE ID is not yet allocated at this stage.

In an embodiment, similar a definition of RA-RNTI may be adopted in the low frequency case, but a time frame such as a sub-slot, a mini-slot, or a slot may be used instead of a subframe. In a multi-beam transmission case (e.g., in a high frequency case), in an embodiment, there is an association of the RA-RNTI with the index of an SS block detected or selected by the UE, as described in more detail below. In various embodiments, the information exchanged at events 120 and 130 of the random access procedure 100 differs from the information exchanged at similar events in LTE. In particular, the RA-RNTI associated with the PRACH in which the random access preamble is transmitted may be computed as, for example:

$$\text{RA-RNTI} = 1 + t\_id + N\_\text{subframe} * f\_id + SS\_block + N\_SS\_Block * SS\_block\_time\_index$$

wherein t_id is an index of a subframe of a plurality of subframes, N_subframe, of a PRACH, f_id is an index in a frequency domain of the PRACH within the subframe, SS_block indicates the SS block index of an SS block within a set of concurrently transmitted SS blocks, SS_block_time_index is an index ranging from 0 to N_SS_Block−1, N_SS_Block is a maximum number of SS blocks concurrently transmitted per SS block time index, and SS_block_time_index is the time index of an SS block.

SS_block indicates the SS block index detected or selected by the UE within a set of concurrently transmitted SS blocks corresponding to one SS block time index. Let N_SS_block be the number of SS blocks concurrently transmitted within one SS block time index. Then the formula is:

$$\text{RA-RNTI} = 1 + t\_id + N\_\text{subframe} * f\_id + SS\_block + N\_SS\_Block * SS\_block\_time\_index$$

where SS_block is an index ranging from 0 to N_SS_Block−1. If N_SS_Block=1, i.e., there is one SS block per SS block time index, then the formula becomes $$\text{RA-RNTI} = 1 + t\_id + N\_\text{subframe} * f\_id + SS\_block\_time\_index$$

The N_SS_Block may be a single maximum value of NR SS blocks per time index or it may vary with the time index. Then the formula becomes $$\text{RA-RNTI} = 1 + t\_id + N\_\text{subframe} * f\_id + SS\_block + N\_SS\_Block(SS\_block\_time\_index) * SS\_block\_time\_index$$

where SS_block is an index ranging from 0 to N_SS_Block (SS_block_time_index)−1.

In an embodiment, an initialization value for the RA-RNTI is generated based on the random access preamble and/or time and frequency resources used by the UE. In another embodiment, the RA-RNTI may also depend on the system frame number (SFN).

In other embodiments, the formula for deriving the RA-RNTI may differ, but in general any such formula for the RA-RNTI may depend on such parameters as slot, minislot, subframe, SS_block time index, and/or the number of concurrently transmitted SS blocks. More specifically, the formula may be linked to the timing of SS blocks. That is, in some embodiments, the preamble/PRACH resources selected by the UE may be linked to the selected or detected SS sequence broadcast by the network. Such a linkage enables the network to calculate the proper RA-RNTI.

The three different scrambling cases described above may be distinguished for the messages at event 130 and event 150: the random access ID used for scrambling the reference signal in the message at event 130 when the UE performs initial random access and has not yet been assigned a UE ID, the temporary ID used for scrambling the reference signal in the message at event iso, and the UE ID used for scrambling the RAR message at event 130 when the UE performs a contention free random access procedure. Generally however, it is understood that the scrambling principles described herein can be applied to any message sent by the network to the UE during the random access procedure and can use any or a combination of the IDs described above. Any of these identifiers might be associated with both data channels and control channels. In particular, any one or any combination of these identifiers might be used to scramble a reference signal, such as the DM-RS, that might be used to demodulate the PDSCH or the PDCCH that might be sent as part of the messages at event 130 and event 150 of FIG. 1.

From the UE's perspective, the SS block time index detected or selected by the UE is associated with the PRACH resource (preamble and/or time-frequency resource) used to send the random access preamble at event 120 in the random access procedure 100 of FIG. 1. From the network's perspective, "SS block" is the SS time index associated with the detected PRACH (preamble and/or time-frequency resources) and for which the RAR is valid.

Figure 2:
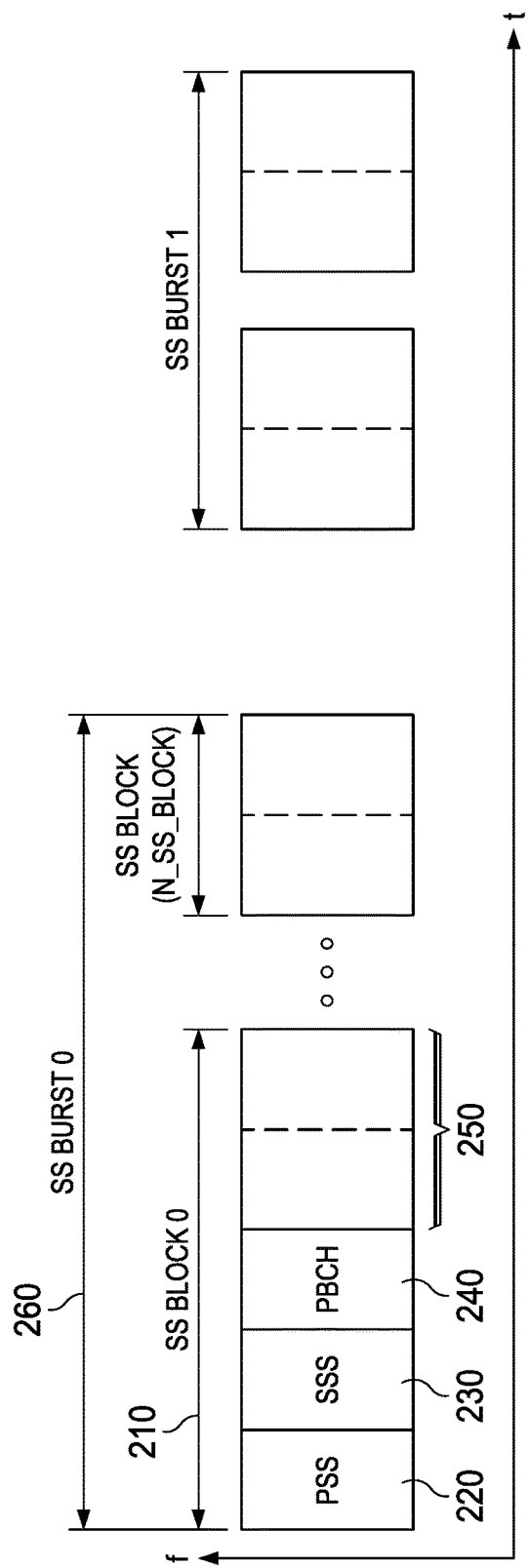
FIG. 2 is a diagram of synchronization signal blocks and synchronization signal bursts.

FIG. 2 illustrates the meaning of the terms SS_block, SS_index, and N_SS_Block. An SS block 210 may include a primary synchronization signal (PSS) 220, a secondary synchronization signal (SSS) 230, a physical broadcast channel (PBCH) 240, and other signals 250. A plurality of SS blocks 210 may occur in a SS burst 260, and the SS blocks 210 in the SS burst 260 may be indexed from 0 to a maximum.

Figure 3:
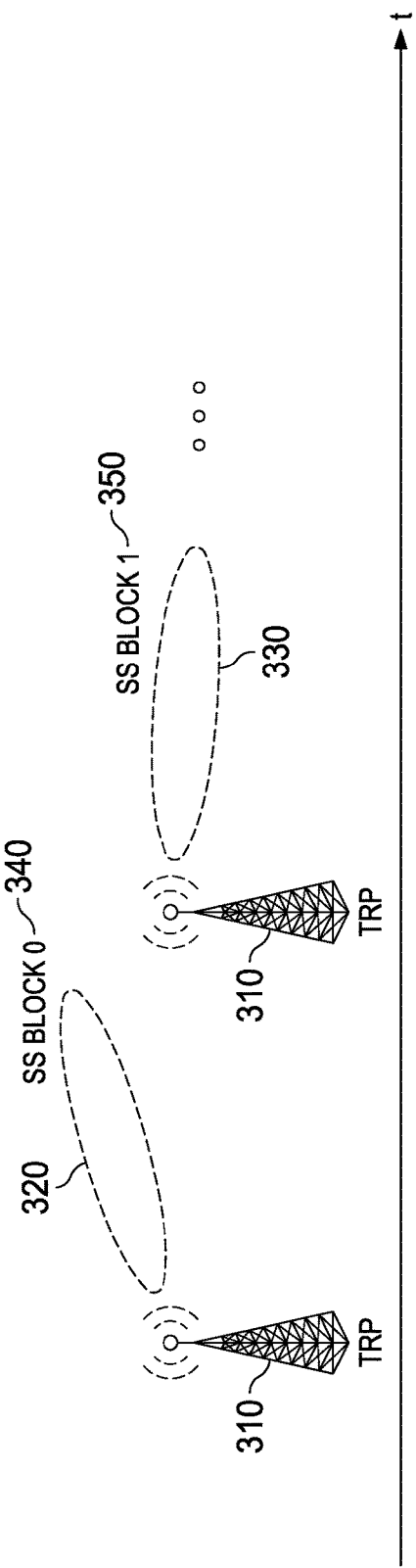
FIG. 3 is a diagram illustrating beamforming and beam sweeping by a transmit/receive point.

In NR, beamforming may be used to direct signals in a particular direction, and beam sweeping may be used to ensure that beamformed signals are directed throughout an entire coverage area. FIG. 3 illustrates such beamforming and beam sweeping. At a first time, a transmit/receive point (TRP) 310 directs a first beamformed beam 320 in a first direction. At a later time, the TRP 310 directs a second beamformed beam 330 in a second direction. The TRP 310 continues sweeping beamformed beams in different directions such that a beamformed beam is directed in every direction of the network's coverage area over a given time.

In an embodiment, the timing of a set of beamformed beams is associated with the sequence of a set of SS blocks. For example, the first beamformed beam 320 may be associated with a first SS block 340, the second beamformed beam 330 may be associated with a second SS block 350, and so on. The indexes of the SS blocks associated in this manner may, in turn, be used in a formula such as that given above for deriving a RA-RNTI. The "SS_index" term in the above formula indicates a beamformed beam within a sequence set of beams.

In an embodiment, a reference signal scrambled with the RA-RNTI disclosed herein may be shared by multiple RAR messages. A reference signal shared in such a manner may occupy a larger portion of the available bandwidth than a reference signal that is not shared. Thus, channel estimation may be improved for a group of UE's that use such a shared reference signal for the estimation.

In another embodiment, a random access method for a network comprises receiving a random access preamble from a UE; generating an identifier; scrambling a reference signal for the UE with the identifier; transmitting a random access message to the UE; and transmitting the scrambled reference signal for demodulation of the random access message by the UE. The identifier may be a temporary UE identifier provided to the UE during the random access method, a random access identifier generated during the random access method, or a dedicated UE identifier assigned by the network. The random access identifier may be generated based on a random access preamble and/or time and frequency resources used by the UE.

In another embodiment, a method for a UE to receive a random access message from a network during a random access procedure with the network comprises receiving a reference signal scrambled with an identifier known to the network; descrambling the reference signal with the same identifier known to the UE; and demodulating the random access message using the descrambled reference signal. The identifier may be a temporary UE identifier provided to the UE during the random access procedure, a random access identifier generated during the random access procedure, or a dedicated UE identifier assigned by the network. The random access identifier may be generated based on a random access preamble and/or time and frequency resources used by the UE.

FIG. 4 illustrates the procedure for reference signal pseudo-random sequence generation provided in Third Generation Partnership Project (3GPP) Technical Specification 36.211. The pseudo-random sequence generator is initialized according to the formula shown in box 410. In an embodiment, the nRNTI term in that formula may be replaced by the RA-RNTI disclosed herein, the RNTI or the T-RNTI.

Figure 5:
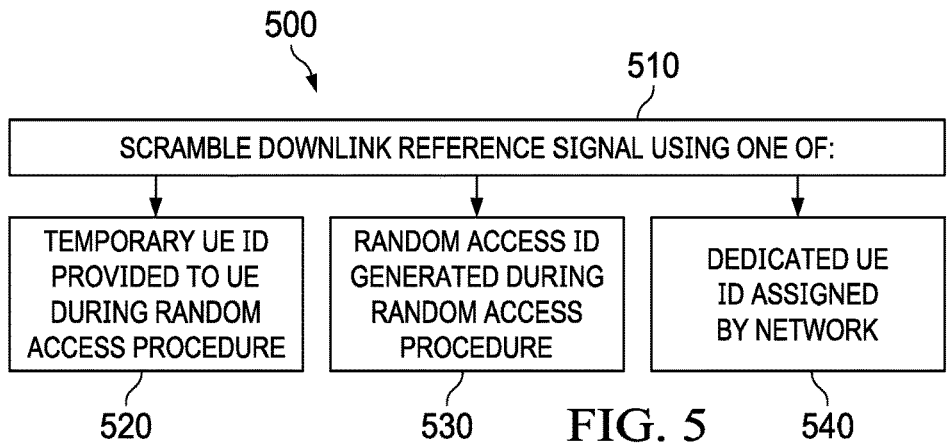
FIG. 5 is a flowchart illustrating an embodiment method at a network for scrambling a downlink reference signal for a UE for demodulation of a downlink random access message during a random access procedure to the network.

FIG. 5 is a flowchart illustrating an embodiment method 500 at a network device for scrambling a downlink reference signal for a UE for demodulation of a downlink random access message during a random access procedure to the network device. At block 510, the downlink reference signal is scrambled using one of a temporary UE ID provided to the UE during the random access procedure 520, a random access ID generated during the random access procedure 530, or a dedicated UE ID assigned by the network device 540.

Figure 6:
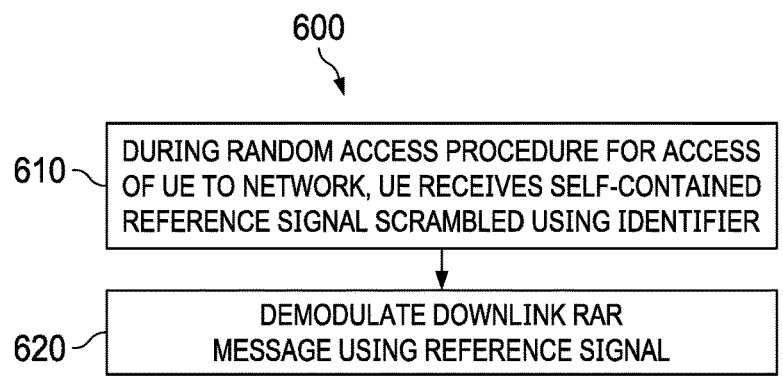
FIG. 6 is a flowchart illustrating an embodiment method for demodulation of a downlink RAR message by a UE.

FIG. 6 is a flowchart illustrating an embodiment method 600 for demodulation of a downlink RAR message by a UE. At block 610, during a random access procedure for access of the UE to a network, the UE receives a downlink reference signal scrambled using an identifier. At block 620, the downlink RAR message is demodulated using the downlink reference signal.

Figure 7:
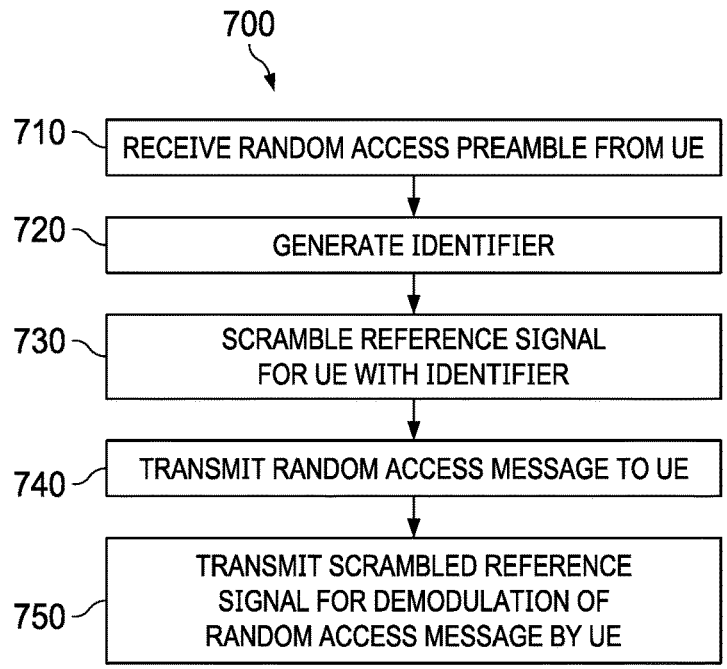
FIG. 7 is a flowchart illustrating an embodiment random access method for a network.

FIG. 7 is a flowchart illustrating an embodiment random access method 700 for a network. At block 710, a random access preamble is received from a UE. At block 720, an identifier is generated. At block 730, a reference signal for the UE is scrambled with the identifier. At block 740, a random access message is transmitted to the UE. At block 750, the scrambled reference signal is transmitted for demodulation of the random access message by the UE.

Figure 8:
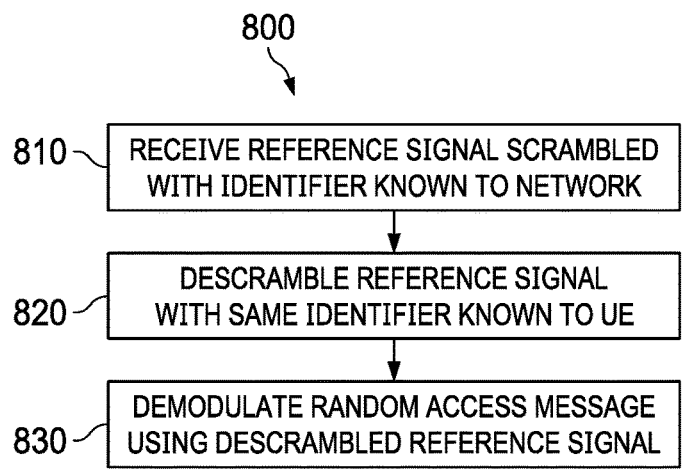
FIG. 8 is a flowchart illustrating an embodiment method for a UE to receive a random access message from a network during a random access procedure with the network.

FIG. 8 is a flowchart illustrating an embodiment method 800 for a UE to receive a random access message from a network during a random access procedure with the network. At block 810, a reference signal scrambled with an identifier known to the network is received. At block 820, the reference signal is descrambled with the same identifier known to the UE. At block 830, the random access message is demodulated using the descrambled reference signal.

Figure 9:
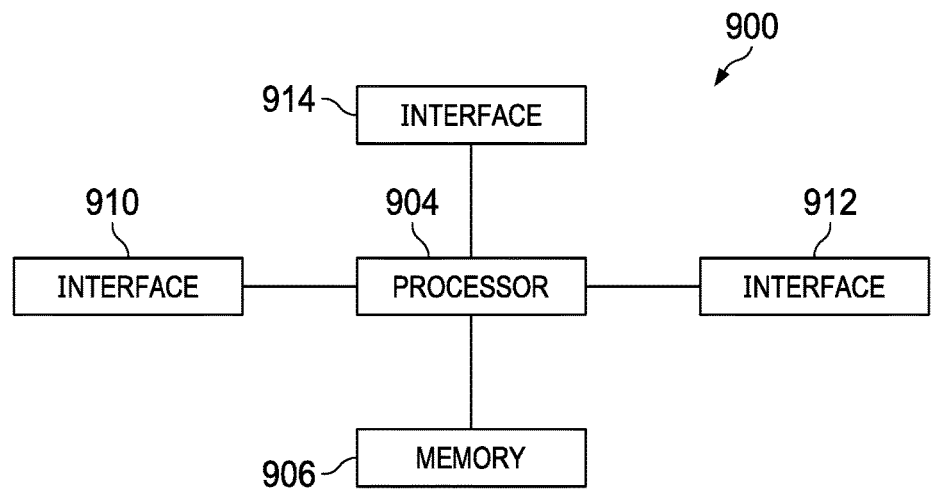
FIG. 9 illustrates a block diagram of an embodiment processing system for performing methods described herein.

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in the figure. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in the figure, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
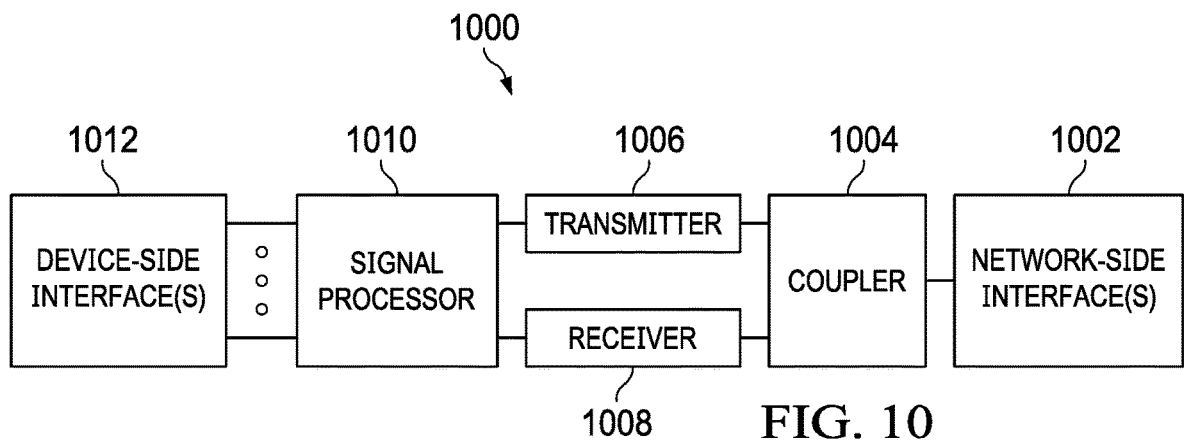
FIG. 10 illustrates a block diagram of a transceiver adapted to transmit and receive signaling over a telecommunications network.

In some embodiments, one or more of the interfaces 910, 912, 914 connects the processing system 900 to a transceiver adapted to transmit and receive signaling over the telecommunications network. FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module and/or an activating unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method at a network device for scrambling a downlink reference signal for a user equipment (UE) for demodulation of a downlink random access message, the method comprising:

during a random access procedure to the network device, scrambling, by the network device, the downlink reference signal using an identifier (ID), wherein the ID is a temporary UE ID provided to the UE during the random access procedure, wherein the ID is a random access ID generated during the random access procedure, or wherein the ID is a dedicated UE ID assigned by the network device, and the random access procedure is a contention-free random access procedure.

2. The method of claim 1, wherein the downlink random access message is at least one of:

a random access response message; or a contention resolution message.

3. The method of claim 1, wherein the random access ID is generated based on at least one of:

a random access preamble; or time and frequency resources used by the UE.

4. The method of claim 1 wherein the random access ID comprises a random access identifier generated based on a synchronization signal (SS) block index of an SS block within a set of SS blocks.

5. The method of claim 1 wherein the random access ID comprises a random access identifier generated based on an SS block time index associated with one or more SS blocks.

6. The method of claim 1, wherein the random access ID comprises a random access radio network temporary identifier (RA-RNTI) generated as $$\text{RA-RNTI}=1+t\_id+N\_\text{subframe}*f\_id+SS\_\text{block}+N\_SS\_\text{Block}*SS\_\text{block\_time\_index}$$

wherein

RA-RNTI is the random access ID, t_id is an index of a subframe of a plurality of subframes, N_subframe, of a physical random access channel (PRACH), f_id is an index in a frequency domain of the PRACH within the subframe, SS_block indicates an SS block index of an SS block within a set of concurrently transmitted SS blocks, SS_block_time_index is an index ranging from 0 to N_SS_Block−1, and N_SS_Block is a maximum number of SS blocks concurrently transmitted per SS block time index.

7. A method for demodulation of a downlink random access response (RAR) message by a user equipment (UE), the method comprising:
during a random access procedure for access of the UE to a network device, receiving, by the UE, a downlink reference signal scrambled using an identifier (ID),
wherein the ID is a temporary UE ID provided to the UE during the random access procedure,
wherein the ID is a random access ID generated during the random access procedure, or wherein the ID is a dedicated UE ID assigned by the network device, and the random access procedure is a contention-free random access procedure; and
demodulating the downlink RAR message using the downlink reference signal.

8. The method of claim 7, wherein the random access ID is a random access radio network temporary identifier (RA-RNTI) generated based on at least one of a random access preamble used by the UE in the random access procedure or time and frequency resources used by the UE in the random access procedure.

9. The method of claim 7, wherein the random access ID is derived in accordance with a synchronization signal transmitted by the network device.

10. The method of claim 7 wherein the identifier comprises a random access identifier generated based on a synchronization signal (SS) block index of an SS block within a set of SS blocks.

11. The method of claim 7 wherein the identifier comprises a random access identifier generated based on an SS block time index associated with one or more SS blocks.

12. The method of claim 7, wherein the identifier comprises an RA-RNTI generated as $$RA\text{-}RNTI = 1 + t\_id + N\_subframe * f\_id + SS\_block + N\_SS\_Block * SS\_block\_time\_index$$

wherein
RA-RNTI is a random access identifier,
t_id is an index of a subframe of a plurality of subframes, N_subframe, of a physical random access channel (PRACH),
f_id is an index in a frequency domain of the PRACH within the subframe,
SS_block indicates an SS block index of an SS block within a set of concurrently transmitted SS blocks,
SS_block_time_index is an index ranging from 0 to N_SS_Block−1, and
N_SS_Block is a maximum number of SS blocks concurrently transmitted per SS block time index.

13. A network device comprising:
a non-transitory memory storage containing instructions; and
one or more processors in communication with the non-transitory memory storage, wherein the one or more processors execute the instructions to:
scramble a downlink reference signal for a user equipment (UE) for demodulation of a downlink random access message during a random access procedure to the network device using an identifier (ID),
wherein the ID is a temporary UE ID provided to the UE during the random access procedure,
wherein the ID is a random access ID generated during the random access procedure, or
wherein the ID is a dedicated UE ID assigned by the network device, and the random access procedure is a contention-free random access procedure.

14. The network device of claim 13, wherein the downlink random access message is at least one of:
a random access response message; or
a contention resolution message.

15. The network device of claim 13, wherein the random access ID is generated based on at least one of:
a random access preamble; or
time and frequency resources used by the UE.

16. The network device of claim 13 wherein the random access ID comprises a random access identifier generated based on a synchronization signal (SS) block index of an SS block within a set of SS blocks.

17. The network device of claim 13 wherein the random access ID comprises a random access identifier generated based on an SS block time index associated with one or more SS blocks.

18. The network device of claim 13, wherein the random access ID comprises a random access radio network temporary identifier (RA-RNTI) generated as $$RA\text{-}RNTI = 1 + t\_id + N\_subframe * f\_id + SS\_block + N\_SS\_Block * SS\_block\_time\_index$$

wherein
RA-RNTI is the random access ID,
t_id is an index of a subframe of a plurality of subframes, N_subframe, of a physical random access channel (PRACH),
f_id is an index in a frequency domain of the PRACH within the subframe,
SS_block indicates an SS block index of an SS block within a set of concurrently transmitted SS blocks,
SS_block_time_index is an index ranging from 0 to N_SS_Block−1, and
N_SS_Block is a maximum number of SS blocks concurrently transmitted per SS block time index.

19. A user equipment (UE) comprising:
a non-transitory memory storage containing instructions; and
one or more processors in communication with the non-transitory memory storage, wherein the one or more processors execute the instructions to:
perform a method for demodulation of a downlink random access response (RAR) message by the UE, the method comprising:
during a random access procedure for access of the UE to a network device, receiving a downlink reference signal scrambled using an identifier (ID),
wherein the ID is a temporary UE ID provided to the UE during the random access procedure,
wherein the ID is a random access ID generated during the random access procedure, or
wherein the ID is a dedicated UE ID assigned by the network device, and the random access procedure is a contention-free random access procedure; and
demodulating the downlink RAR message using the downlink reference signal.

20. The UE of claim 19, wherein the random access ID is a random access radio network temporary identifier (RA-RNTI) generated based on at least one of a random access preamble used by the UE in the random access procedure or time and frequency resources used by the UE in the random access procedure.

21. The UE of claim 19 wherein the ID comprises a random access identifier generated based on a synchronization signal (SS) block index of an SS block within a set of SS blocks.

22. The UE of claim 19 wherein the ID comprises a random access identifier generated based on an SS block time index associated with one or more SS blocks.

23. The UE of claim 19, wherein the ID comprises an RA-RNTI generated as $$RA\text{-}RNTI=1+t\_id+N\_\text{subframe}*f\_id+SS\_block+N\_SS\_Block*SS\_block\_time\_index$$

wherein
RA-RNTI is a random access identifier,
t_id is an index of a subframe of a plurality of subframes, N_subframe, of a physical random access channel (PRACH),
f_id is an index in a frequency domain of the PRACH within the subframe,
SS_block indicates an SS block index of an SS block within a set of concurrently transmitted SS blocks,
SS_block_time_index is an index ranging from 0 to N_SS_Block−1, and
N_SS_Block is a maximum number of SS blocks concurrently transmitted per SS block time index.

24. A network device comprising:
a non-transitory memory storage containing instructions; and
one or more processors in communication with the non-transitory memory storage, wherein the one or more processors execute the instructions to perform a method comprising:
  receiving a random access preamble from a user equipment (UE);
  generating an identifier (ID);
  scrambling a downlink reference signal for the UE with the ID during a random access procedure to the network device,
    wherein the ID is a temporary UE ID provided to the UE during the random access procedure,
    wherein the ID is a random access ID generated during the random access procedure, or
    wherein the ID is a dedicated UE ID assigned by the network device, and the random access procedure is a contention-free random access procedure;
  transmitting a random access message to the UE; and
  transmitting the scrambled downlink reference signal for demodulation of the random access message by the UE.

25. The network device of claim 24, wherein the downlink reference signal for the UE is associated with a Physical Downlink Shared Channel (PDSCH).

26. The network device of claim 24, wherein the downlink reference signal for the UE is associated with a Physical Downlink Control Channel (PDCCH).

27. The network device of claim 26, wherein the random access ID is generated based on at least one of:
the random access preamble; or
time and frequency resources used by the UE.

28. The network device of claim 24 wherein the identifier comprises a random access identifier generated based on a synchronization signal (SS) block index of an SS block within a set of SS blocks.

29. The network device of claim 24 wherein the identifier comprises a random access identifier generated based on an SS block time index associated with one or more SS blocks.

30. The network device of claim 24, wherein the identifier comprises a random access radio network temporary identifier (RA-RNTI) generated as $$RA\text{-}RNTI=1+t\_id+N\_\text{subframe}*f\_id+SS\_block+N\_SS\_Block*SS\_block\_time\_index$$

wherein
RA-RNTI is a random access identifier,
t_id is an index of a subframe of a plurality of subframes, N_subframe, of a physical random access channel (PRACH),
f_id is an index in a frequency domain of the PRACH within the subframe,
SS_block indicates an SS block index of an SS block within a set of concurrently transmitted SS blocks,
SS_block_time_index is an index ranging from 0 to N_SS_Block−1, and
N_SS_Block is a maximum number of SS blocks concurrently transmitted per SS block time index.

31. A user equipment (UE) comprising:
a non-transitory memory storage containing instructions; and
one or more processors in communication with the non-transitory memory storage, wherein the one or more processors execute the instructions to perform a method comprising:
  during a random access procedure, receiving a downlink reference signal scrambled with an identifier (ID) known to a network device with which the UE is performing the random access procedure,
    wherein the ID is a temporary UE ID provided to the UE during the random access procedure,
    wherein the ID is a random access ID generated during the random access procedure, or
    wherein the ID is a dedicated UE ID assigned by the network device, and the random access procedure is a contention-free random access procedure;
  descrambling the downlink reference signal with the same identifier known to the UE; and
  demodulating, using the descrambled downlink reference signal, a random access message received from the network device during the random access procedure.

32. The UE of claim 31, wherein the random access ID is generated based on at least one of:
a random access preamble; or
time and frequency resources used by the UE.

* * * * *